Sept. 16, 1952 G. HEPP 2,611,039

APPARATUS INCLUDING A TITANATE CONDENSER FOR AMPLIFYING AN ELECTRICAL SIGNAL

Filed May 3, 1947

G. HEPP
INVENTOR

BY Fred M. Vogel
AGENT

UNITED STATES PATENT OFFICE 2,611,039

APPARATUS INCLUDING A TITANATE CONDENSER FOR AMPLIFYING AN ELECTRICAL SIGNAL

Gerard Hepp, Eindhoven, Netherlands, assignor to Hartford National Bank and Trust Company, Hartford, Conn., as trustee Application May 3, 1947, Serial No. 745,877
In the Netherlands March 30, 1946

Section 1, Public Law 690, August 8, 1946
Patent expires March 30, 1966

3 Claims. (Cl. 179—171)

This invention relates to a circuit-arrangement for amplifying electric signals.

The object of the invention is to provide an improved amplifier circuit.

More specifically, the object of the invention is to provide an amplifier circuit which can be used to amplify direct as well as alternating current voltages.

Further objects of the invention will appear from the following description.

According to the invention the signal is supplied, together with an auxiliary oscillation, to an electric circuit including a condenser having a dielectric the properties of which are dependent on the voltage across the condenser and/or on the current flowing through the condenser (modulation), the amplified signal being derived, by demodulation, from one of the modulated oscillations produced in the circuit and more particularly from the modulated auxiliary oscillation, the amplified signal being back-coupled wholly or in part and in positive or in negative sense to the modulating portion of the arrangement.

With positive feedback the amplification is increased and with negative feedback more linear amplification and greater stability of the arrangement are obtained.

The dielectric used for the condenser may be Seignette-salt or $KH_2PO_4$ and some compounds isomorphous therewith.

Satisfactory results are also obtained with substances substantially consisting of representatives of the ternary system $BaTiO_3$—$SrTiO_3$—$PbTiO_3$. It is not necessary for all of the three components of the ternary system to be present at the same time.

Highly satisfactory results are obtained with dielectrics substantially constituted by $BaTiO_3$, or by representatives of the binary system $BaTiO_3$—$SrTiO_3$, for example $BaTiO_3$ containing 35 mol. percent of $SrTiO_3$ at the most. If the circuit-arrangement is used at room temperature, it is preferable to choose the percentage of $SrTiO_3$ between 15% and 30%. The various binary and ternary mixed products constitute homogeneous mixed crystals which, as the constitutive raw materials, exhibit a perowskite structure. The term "perowskite" relates to the crystal structure of the metatitanates. This structure is in contradisdinction to the spinel structure of other titanates, as is well known in the art of crystalline structures.

Under certain conditions it is also possible to utilise blocking-layer rectifiers as condensers having a voltage-dependent capacity.

The properties of the dielectric need not only be dependent on voltage and/or current. As a rule, the dielectric constant, frequently the loss angle, and in certain cases both of them exhibit this dependency.

The invention will be explained more fully by reference to the accompanying drawing in which.

Figures 1, 2:
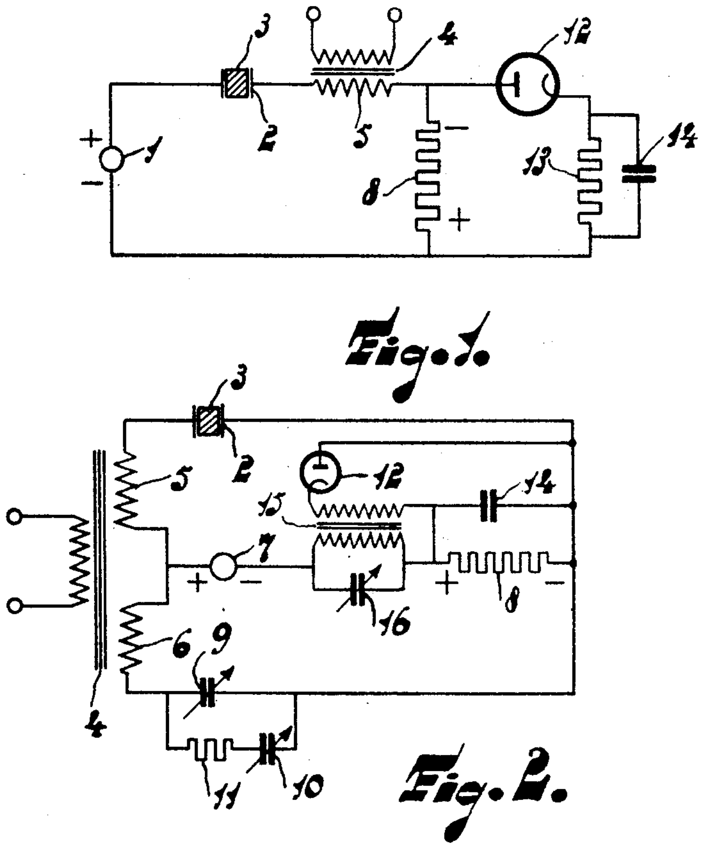
Fig. 1 shows one circuit arrangement according to the invention.
Fig. 2 shows another circuit arrangement according to the invention.

In Fig. 1, reference numeral 1 designates the source supplying the signal to be amplified, for example a low-frequency signal, or a direct voltage. As a rule, it is desirable that the signal should have the character of a direct voltage. It may be constituted, for example, by the superposition of an alternating voltage and a direct voltage in such manner that the combined signal always exhibits the same polarity. This polarity is indicated in the figure. However, under certain conditions the polarity may be as well of opposite sign.

The circuit, to which the source 1 is connected, further includes a condenser 2 having a dielectric 3 the secondary winding 5 of a transformer 4, and a resistance 8 which fulfills the function of an output impedance.

An alternating voltage is supplied to the primary winding of the transformer 4. Consequently, an alternating voltage is induced, via the secondary winding 5, in the above-mentioned circuit of the condenser 2, which voltage is active in the circuit as an auxiliary oscillation.

In amplifying low-frequency oscillations, for which the circuit-arrangement is particularly adapted, the frequency of the auxiliary oscillation is required to be higher than, and preferably high with respect to the highest frequency occurring with the oscillations to be amplified.

The dielectric 3 is a substance the properties of which are dependent on the voltage set across the condenser 2 and/or on the current flowing through this condenser, for example Seignette-salt or one of the above-mentioned perowskites. This dependency is frequently complicated since the said properties are, as a rule, dependent not only on the signal voltage but also on the auxiliary voltage.

If, as already mentioned hereinbefore, the combined signal voltage has the character of a direct voltage the polarity of which always remains the same and if the auxiliary voltage has a constant value, it appears that the dielectric constant $\epsilon$ of the said dielectrics generally decreases upon increasing signal voltage. However, with the said perowskites there are also regions in which just the contrary occurs. This fact is, of course, to be taken into account in the practical use of the said dielectrics.

Owing to the non-linear properties of the condenser 2, the auxiliary oscillation inter alia is modulated in amplitude by the signal. Now, according to the invention, the amplified signal may be derived by demodulation from the modulated auxiliary oscillation. This is effected by means of a diode 12 in conjunction with a resistance 13 and a condenser 14, which are connected in parallel. The amplified signal may be taken from the system 13.

According to another feature of the invention, back-coupling of the amplified signal is obtained in that the voltage set up across the resistance 8 and obtained by rectification reacts upon the modulating portion.

Even in the absence of a signal the resistance 8 exhibits a direct voltage which is produced by rectification of the auxiliary oscillation. The polarity of this voltage is indicated in the figure. For the sake of simplicity it is assumed hereinafter that the said voltage does not affect the polarity of the total signal voltage set up across the condenser, which may be ensured, for example, either by giving the constant biassing potential corresponding to the signal a sufficiently high value, or by causing both voltages to be active in the same sense (vide Fig. 1).

Positive or negative feedback is obtained by the variations in the voltage set up across the resistance 8, which variations arise due to the presence of the signal.

If it is assumed that upon increasing signal voltage the dielectric constant $\epsilon$ and hence the capacity of the condenser decreases and, consequently, the impedance of the circuit increases, then upon increasing signal voltage the current of the auxiliary oscillation and also the rectified voltage across the resistance 8 will decrease, so that negative feedback occurs. If the connection of the diode is reversed, or if the polarity of the signal to be amplified is reversed, then positive feedback occurs. The use of positive feedback permits of obtaining greater amplification whereas the use of negative feedback ensures more linear amplification and greater stability of the circuit-arrangement.

The circuit-arrangement shown in Figure 2 is partly identical to that shown in Fig. 1. In this case, however, the circuit of the condenser 2 is coupled by inductive means via a transformer 15, to the circuit containing the diode 12, which ensures greater amplification of voltage and thus better feedback.

In order to minimize the current of the frequency of the auxiliary oscillation which flows through the transformer 15, the circuit-arrangement is of the push-pull type, which is ensured by connecting parallel to the series-connected secondary winding 5 and condenser 2, a second series connection constituted by another secondary winding 6 of the transformer 4 and a variable condenser 9 having a dielectric independent of voltage, for example an air dielectric. The condenser 9 is adjusted so that in the absence of a signal no current or substantially no current of the frequency of the auxiliary oscillation flows through that branch of the circuit which includes the primary winding of the transformer 15. This adjustment may be improved, as shown in the figure, by providing in parallel with the condenser 9, a variable condenser 10 and a resistance 11 which are connected in series.

By proper adjustment of the condenser 10 and the resistance 11 it is possible to balance the losses of the condenser 2, so that almost complete compensation of the current of the auxiliary oscillation may be ensured.

The circuit-arrangements as described are adapted not only for the amplification of low-frequency signals and direct voltages but also for the amplification of signals modulated on a carrier wave and may also be utilized, for example, in wireless receivers.

In certain cases it is preferable to include in the circuit one or more oscillatory circuits which are tuned to the frequency of the auxiliary oscillation, or to a harmonic of this frequency, or to the difference frequency of the auxiliary oscillation and the signal to be amplified. The amplified signal may be derived, by demodulation, from the modulated oscillations produced across the said circuits, as the case may be after being further amplified.

It is not necessary that the signal source, the source of auxiliary oscillations, the condenser and the output impedance or the demodulator are all of them included in series in the electric circuit. It is also possible for a number of these elements to be connected in parallel, provided that undesirable short-circuits with respect to the oscillations active in the circuit are avoided.

If use is made of positive feedback of sufficient strength, it is possible to generate oscillations in the circuit.

What I claim is:

1. A signal amplifying circuit arrangement comprising, a source of desired signals having a given voltage polarization, a capacitive element having a dielectric selected from the group consisting of compounds of the ternary system of barium-titanate, strontium-titanate and lead-titanate, a source of auxiliary oscillations, means to apply said desired signals and said auxiliary oscillations to said capacitive element thereby to amplitude modulate said auxiliary oscillations, demodulation means to derive an output signal from the modulated auxiliary oscillations, said source of desired signals, said capacitive element and said demodulation means comprising a series circuit, and feedback means comprising a resistive element coupled in parallel with said demodulation means to apply a portion of said output signal to said capacitive element.

2. A circuit arrangement, as set forth in claim 1, where the dielectric of the said capacitive element is comprised of barium-titanate and a maximum of 35 mol. percent of strontium-titanate.

3. A circuit arrangement, as set forth in claim 1, where the dielectric of the said capacitive element is substantially comprised of a mixed crystal of barium-titanate and 15 to 30% strontium-titanate.

GERARD HEPP.

REFERENCES CITED

The following references are of record in the file of this patent:

UNITED STATES PATENTS

| Number | Name | Date |
|---|---|---|
| 2,191,315 | Guanella | Feb. 20, 1940 |
| 2,297,543 | Eberhardt | Sept. 29, 1942 |
| 2,473,556 | Wiley | Jan. 21, 1949 |
| 2,461,307 | Antalek | Feb. 8, 1949 |